US008030623B2

(12) United States Patent
Jiang et al.

(10) Patent No.: US 8,030,623 B2
(45) **Date of Patent: *Oct. 4, 2011**

(54) METHOD AND DEVICE FOR MEASURING ELECTROMAGNETIC SIGNAL

(75) Inventors: Kai-Li Jiang, Beijing (CN); Lin Xiao, Beijing (CN); Zhuo Chen, Beijing (CN); Shou-Shan Fan, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 137 days.

This patent is subject to a terminal disclaimer.

(21) Appl. No.: 12/459,546

(22) Filed: Jul. 2, 2009

(65) Prior Publication Data

US 2010/0019171 A1 Jan. 28, 2010

(30) Foreign Application Priority Data

Jul. 25, 2008 (CN) .......................... 2008 1 0142613

(51) Int. Cl.
*G01T 1/16* (2006.01)

(52) U.S. Cl. ..................................... 250/472.1; 977/954

(58) Field of Classification Search .................. 977/954; 250/472.1

See application file for complete search history.

(56) References Cited

U.S. PATENT DOCUMENTS 1,528,774 A 3/1925 Kranz
4,334,321 A 6/1982 Edelman
4,503,564 A 3/1985 Edelman et al.
4,641,377 A 2/1987 Rush et al.
4,766,607 A 8/1988 Feldman
5,694,477 A 12/1997 Kole
6,473,625 B1 10/2002 Williams et al.
6,803,116 B2 10/2004 Ikeda
6,808,746 B1 10/2004 Dai et al.
6,921,575 B2 7/2005 Horiuchi et al.
7,045,108 B2 5/2006 Jiang et al.
7,393,428 B2 7/2008 Huang et al.
7,723,684 B1 5/2010 Haddon et al.
7,799,163 B1 9/2010 Mau et al.
2001/0005272 A1 6/2001 Buchholz
2005/0040371 A1 2/2005 Watanabe et al.
2005/0201575 A1 9/2005 Koshida et al.
2006/0147081 A1 7/2006 Mango, III et al.
2007/0166223 A1 7/2007 Jiang et al.

(Continued)

FOREIGN PATENT DOCUMENTS

CN 2787870 Y 6/2006

(Continued)

OTHER PUBLICATIONS

Silvanus P. Thompson, The Photophone, Nature, Sep. 23, 1880, vol. XXII, No. 569, pp. 481.

(Continued)

*Primary Examiner* — Constantine Hannaher
(74) *Attorney, Agent, or Firm* — Altis Law Group, Inc.

(57) ABSTRACT

A method for measuring properties of an electromagnetic signal includes following steps. An electromagnetic signal measuring device that includes a carbon nanotube structure is provided. The carbon nanotube structure has a plurality of carbon nanotubes. An electromagnetic signal is received by the carbon nanotube structure in the electromagnetic signal measuring device. The intensity of the electromagnetic signal is measured by a sound produced by the carbon nanotube structure.

20 Claims, 13 Drawing Sheets

U.S. PATENT DOCUMENTS

| | | | | |
|---|---|---|---|---|
| 2008/0095694 | A1 | 4/2008 | Nakayama et al. | |
| 2008/0170982 | A1 | 7/2008 | Zhang et al. | |
| 2009/0016951 | A1 | 1/2009 | Kawabata et al. | |
| 2009/0145686 | A1 | 6/2009 | Watabe et al. | |
| 2010/0019159 | A1* | 1/2010 | Jiang et al. | 250/370.01 |

FOREIGN PATENT DOCUMENTS

| | | | |
|---|---|---|---|
| CN | 1821048 | A | 8/2006 |
| JP | 2003198281 | A | 7/2003 |
| JP | 2004229250 | A | 8/2004 |
| JP | 2005189322 | A | 7/2005 |
| JP | 2005333601 | A | 12/2005 |
| WO | WO0073204 | A1 | 12/2000 |
| WO | WO2007099975 | A1 | 9/2007 |

OTHER PUBLICATIONS

Alexander Graham Bell, Selenium and the Photophone, Nature, Sep. 23, 1880, pp. 500-503.

Lee et al., Photosensitization of nonlinear scattering and photoacoustic emission from single-walled carbon nanotubes, Applied Physics Letters, Mar. 13, 2008, 92, 103122.

Lin Xiao, Zhuo Chen, Chen Feng, Liang Liu et al., Flexible, Stretchable, Transparent Carbon Nanotube Thin Film Loudspeakers, Nano Letters, 2008, pp. 4539-4545, vol. 8, No. 12, US.

Kaili Jiang, Qunqing Li, Shoushan Fan, Spinning continuous carbon nanotube yarns, Nature, Oct. 24, 2002, pp. 801, vol. 419.

Kai Liu, Yinghui Sun, Lei Chen, Chen Feng, Xiaofeng Feng, Kaili Jiang et al., Controlled Growth of Super-Aligned Carbon Nanotube Arrays for Spinning Continuous Unidirectional Sheets with Tunable Physical Properties, Nano Letters, 2008, pp. 700-705, vol. 8, No. 2.

Lina Zhang, Chen Feng, Zhuo Chen, Liang Liu et al., Superaligned Carbon Nanotube Grid for High Resolution Transmission Electron Microscopy of Nanomaterials, Nano Letters, 2008, pp. 2564-2569, vol. 8, No. 8.

Strutt John William, Rayleigh Baron, The Theory of Sound, 1926, pp. 226-235, vol. 2.

Frank P. Incropera, David P. Dewitt et al., Fundamentals of Heat and Mass Transfer, 6th ed., 2007, pp. A-5, Wiley:Asia.

Zhuangchun Wu, Zhihong Chen, Xu Du et al.,Transparent, Conductive Carbon Nanotube Films, Science, Aug. 27, 2004, pp. 1273-1276, vol. 305.

P. De Lange, On Thermophones, Proceedings of the Royal Society of London. Series A, Apr. 1, 1915, pp. 239-241, vol. 91, No. 628.

http://www.physorg.com/news123167268.html, Cambridge, Nokia introduce new stretchable and flexible mobile phone concept (Feb. 25, 2008).

Swift Gregory W., Thermoacoustic Engines and Refrigerators, Physics Today, Jul. 1995, pp. 22-28, vol. 48.

Mei Zhang, Shaoli Fang, Anvar A. Zakhidov, Sergey B. Lee et al., Strong, Transparent, Multifunctional, Carbon Nanotube Sheets, Science, Aug. 19, 2005, pp. 1215-1219, vol. 309.

Xiaobo Zhang, Kaili Jiang, Chen Feng, Peng Liu et al., Spinning and Processing Continuous Yarns from 4-Inch Wafer Scale Super-Aligned Carbon Nanotube Arrays, Advanced Materials, 2006, pp. 1505-1510, vol. 18.

Yang Wei, Kaili Jiang, Xiaofeng Feng, Peng Liu et al., Comparative studies of multiwalled carbon nanotube sheets before and after shrinking, Physical Review B, Jul. 25, 2007, vol. 76, 045423.

William Henry Preece, On Some Thermal Effects of Electric Currents, Proceedings of the Royal Society of London, 1879-1880, pp. 408-411, vol. 30.

Braun Ferdinand, Notiz uber Thermophonie, Ann. Der Physik, Apr. 1898, pp. 358-360, vol. 65.

H.D. Arnold, I.B. Crandall, The Thermophone as a Precision Source of Sound, Physical Review, 1917, pp. 22-38, vol. 10.

W. Yi, L.Lu, Zhang Dianlin et al., Linear Specific Heat of Carbon Nanotubes, Physical Review B, Apr. 1, 1999, vol. 59, No. 14, R9015-9018.

Edward C. Wente, The Thermophone, Physical Review, 1922, pp. 333-345, vol. 19.

J.J.Hopfield, Spectra of Hydrogen, Nitrogen and Oxygen in the Extreme Ultraviolet, Physical Review, 1922, pp. 573-588, vol. 20.

Amos, S.W.; "Principles of Transistor Circuits"; 2000; Newnes-Butterworth-Heinemann; 9th ed.; p. 114.

* cited by examiner

METHOD AND DEVICE FOR MEASURING ELECTROMAGNETIC SIGNAL

RELATED APPLICATIONS

This application claims all benefits accruing under 35 U.S.C. §119 from China Patent Application No. 200810142613.3, filed on Jul. 25, 2008, in the China Intellectual Property Office. This application is related to copending applications entitled, "ACOUSTIC TRANSMITTING SYSTEM", U.S. patent application Ser. No. 12/459,565, filed Jul. 2, 2009; "ACOUSTIC DEVICE", U.S. patent application Ser. No. 12/459,564, Jul. 2, 2009; "ACOUSTIC DEVICE", U.S. patent application Ser. No. 12/459,543, filed Jul. 2, 2009; and "ACOUSTIC DEVICE", U.S. patent application Ser. No. 12/459,495, filed Jul. 2, 2009; "ACOUSTIC DEVICE", U.S. patent application Ser. No. 12/455,606, filed Jun. 4, 2009.

BACKGROUND

1. Technical Field

The present disclosure relates to methods and devices for measuring electromagnetic signals and, particularly, to a carbon nanotube based method and device for measuring certain properties of an electromagnetic signal.

2. Description of Related Art

Polarizing direction and intensity are two important properties of an electromagnetic signal. A related art method for measuring the polarizing direction of a visible light includes steps of: disposing a polarizer and a target in the path of the visible light, and rotating the polarizer. The polarized visible light goes through the polarizer and irradiates the target. During rotation of the polarizer, the light on the target changes periodically from the dark to the bright. When the light on the target is darkest, the polarizing direction of the visible light is perpendicular to the polarizing direction of the polarizer. When the light on the target is brightest, the polarizing direction of the visible light is parallel to the polarizing direction of the polarizer. Thus, one can tell the polarizing direction of the visible light by observing the light on the target. Similar, one can qualitatively tell the intensity of the visible light by observing the brightness or darkness of the visible light.

However, the above observing methods for determining the intensity and polarizing direction are not suitable for invisible light such as infrared, ultraviolet, and other electromagnetic signals. In general, to measure the intensity and polarizing direction of invisible light, a photoelectric sensor is disposed at the target position. Thus, the invisible light is transformed to electric signals, and the electric signals can be measured.

However, the method for measuring the invisible light is complicated and requires a lot of optical and electrical devices. Besides, the conventional polarizers can only achieve good polarization in a certain regions of the electromagnetic spectra, (e.g. microwave, infrared, visible light, ultraviolet, etc.), but can't have a uniform polarization property over the entire spectrum. Thus, when the wavelength of the light changes, the polarizer has to be changed accordingly.

The photoacoustic effect is a kind of the thermoacoustic effect and a conversion between light and acoustic signals due to absorption and localized thermal excitation. When rapid pulses of light are incident on a sample of matter, the light can be absorbed and the resulting energy will then be radiated as heat. This heat causes detectable sound signals due to pressure variations in the surrounding (i.e., environmental) medium. The photoacoustic effect was first discovered by Alexander Graham Bell (Bell, A. G: "Selenium and the Photophone" in Nature, September 1880).

At present, photoacoustic effect is widely used in the field of material analysis. For example, photoacoustic spectrometers and photoacoustic microscopes based on the photoacoutic effect are widely used in the field of material analysis. A known photoacoustic spectrum device generally includes a light source such as a laser, a sealed sample room, and a signal detector such as a microphone. A sample such as a gas, liquid, or solid is disposed in the sealed sample room. The laser is irradiated on the sample. The sample emits sound signals due to the photoacoustic effect. Generally, different materials have different maximum absorption at different laser frequencies. The microphone detects the frequency of the laser light where the sample has the maximum absorption. However, most of the sound signals are not strong enough to be heard by human ear but detected by complicated sensor, and the frequency of the sound signals can even be in the region above megahertz (MHz).

Carbon nanotubes (CNT) are a novel carbonaceous material having extremely small size and extremely large specific surface area. Carbon nanotubes have received a great deal of interest since the early 1990s, and have interesting and potentially useful electrical and mechanical properties, and have been widely used in a plurality of fields.

What is needed, therefore, is to provide a simpler method and device for measuring intensity and polarizing direction of an electromagnetic signal.

BRIEF DESCRIPTION OF THE DRAWINGS

Many aspects of the present method and device for measuring intensity and polarizing direction of an electromagnetic signal can be better understood with reference to the following drawings. The components in the drawings are not necessarily to scale, the emphasis instead being placed upon clearly illustrating the principles of the present method and device for measuring intensity and polarizing direction of an electromagnetic signal.

Figure 1:
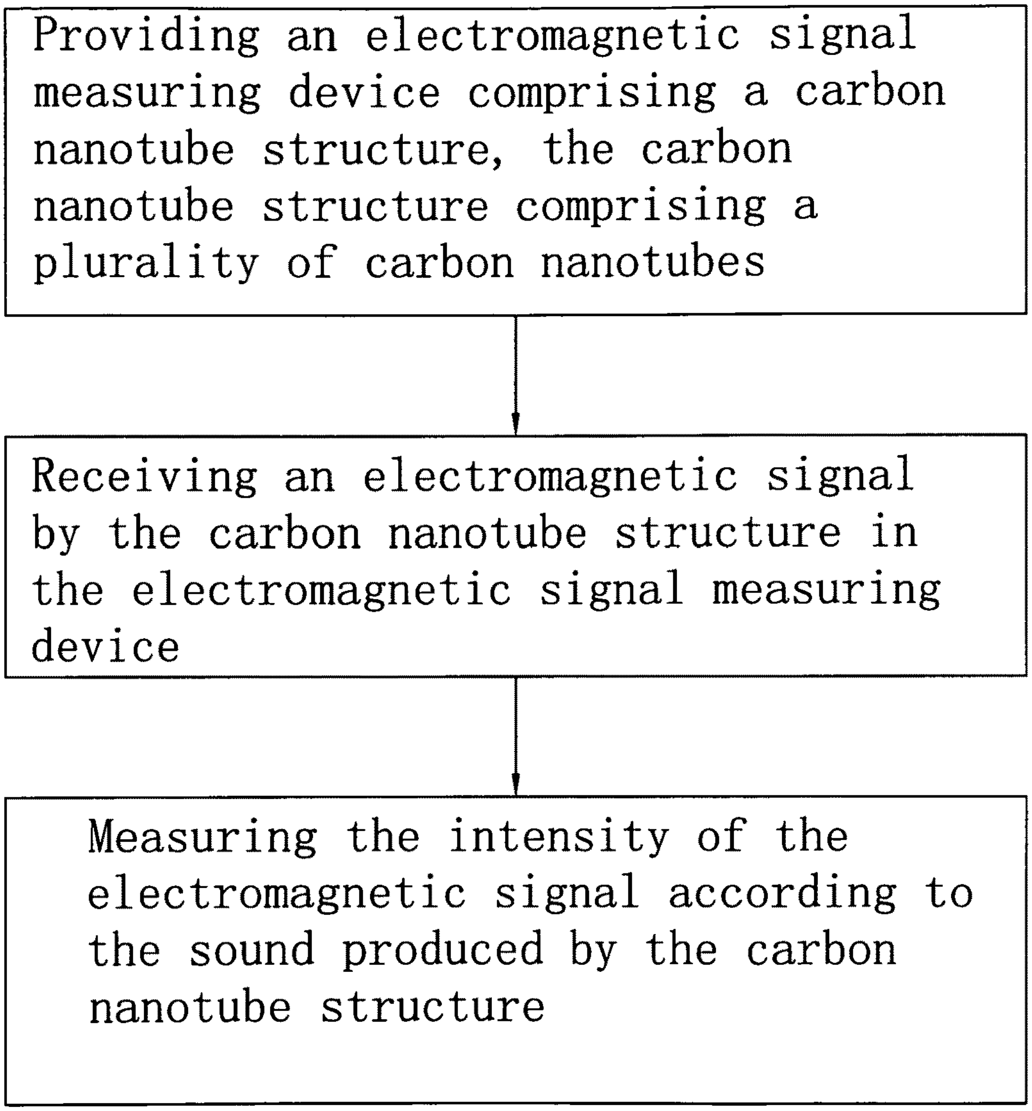
FIG. 1 is a flow chart of a method for measuring intensity and polarizing direction of an electromagnetic signal in accordance with a first embodiment.

Corresponding reference characters indicate corresponding parts throughout the several views. The exemplifications set out herein illustrate at least one embodiment of the present method and device for measuring intensity and polarizing direction of an electromagnetic signal in at least one form, and such exemplifications are not to be construed as limiting the scope of the invention in any manner.

DETAILED DESCRIPTION

Reference will now be made to the drawings to describe, in detail, embodiments of the present method and device for measuring intensity and polarizing direction of an electromagnetic signal.

Figure 2:
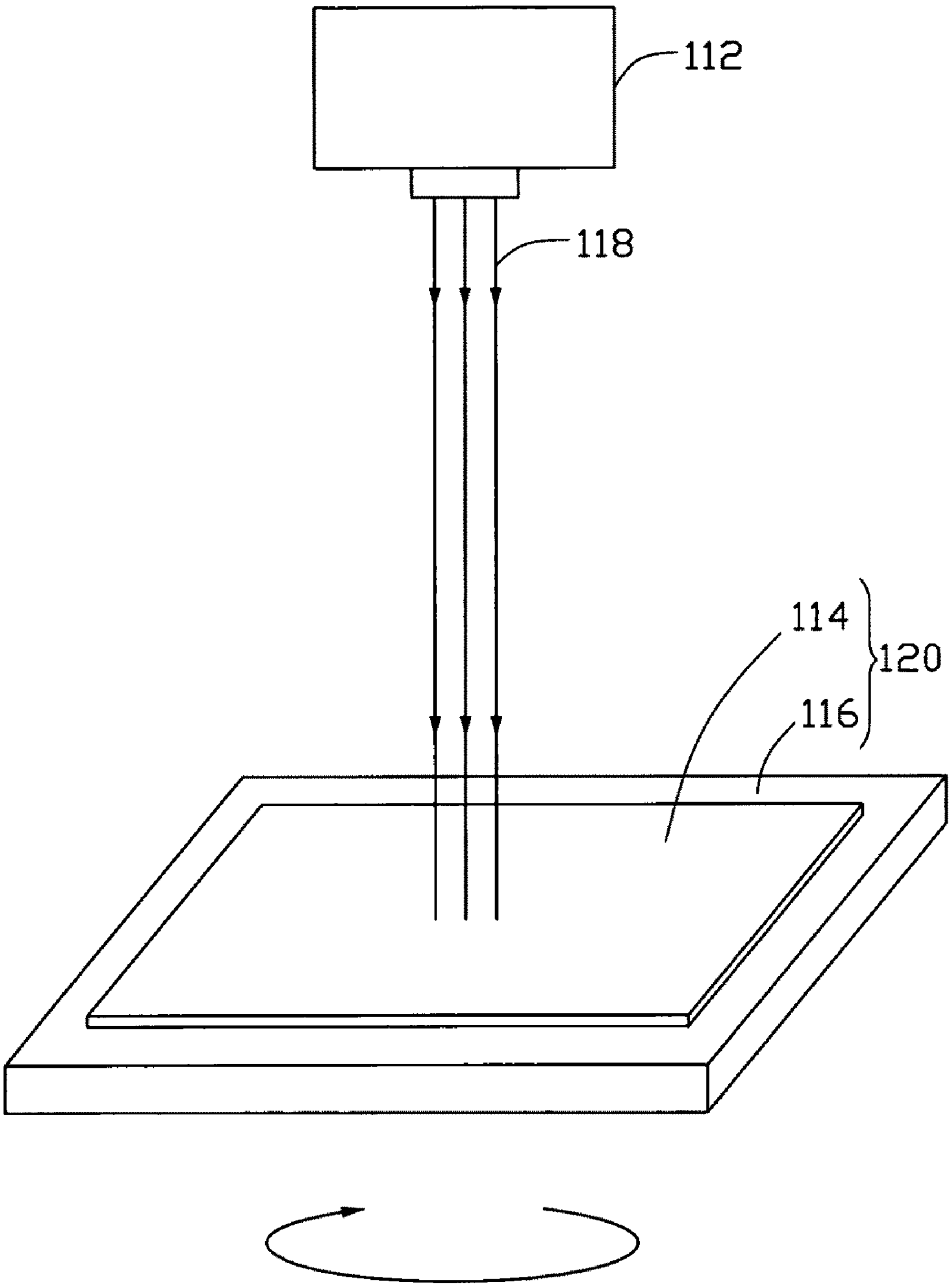
FIG. 2 is a schematic view of the method for measuring the intensity and polarizing direction of the electromagnetic signal of FIG. 1.

Referring to FIGS. 1 and 2, the method for measuring intensity and polarizing direction of an electromagnetic signal includes steps of:

(a) providing an electromagnetic signal measuring device 120, the electromagnetic signal measuring device 120 including a supporting element 116 and a carbon nanotube structure 114 secured to supporting element 116, the carbon nanotube structure 114 including a plurality of carbon nanotubes parallel to a surface thereof and aligned approximately along a same direction;

(b) receiving an electromagnetic signal 118 emitted from an electromagnetic signal source 112; and (d) measuring the intensity of the electromagnetic signal 118 according the sound produced by the carbon nanotube structure 114.

In step (a), the carbon nanotube structure 114 is an acoustic element that capable of emitting sound waves by absorbing electromagnetic signal 118. The carbon nanotube structure 114 includes a plurality of carbon nanotubes and has a large specific surface area (e.g., above 30 $m^2/g$). The heat capacity per unit area of the carbon nanotube structure 114 can be less than $2\times10^{-4}$ $J/m^2\cdot K$. In one embodiment, the heat capacity per unit area of the carbon nanotube structure 114 is less than $1.7\times10^{-6}$ $J/m^2\cdot K$. The carbon nanotube structure 114 can include carbon nanotubes uniformly distributed therein, and the carbon nanotubes therein can be combined by van der Waals attractive force therebetween. The carbon nanotubes in the carbon nanotube structure 114 can be selected from a group consisting of single-walled, double-walled, and/or multi-walled carbon nanotubes.

The carbon nanotube structure 114 can be a substantially pure structure consisting mostly of carbon nanotubes. In another embodiment, the carbon nanotube structure 114 can also include other components. For example, metal layers can be deposited on surfaces of the carbon nanotubes. However, whatever the detailed structure of the carbon nanotube structure 114, the heat capacity per unit area of the carbon nanotube structure 114 should be relatively low, such as less than $2\times10^{-4}$ $J/m^2\cdot K$, and the specific surface area of the carbon nanotube structure 114 should be relatively high.

The carbon nanotube structure 114 may have a substantially planar structure. The thickness of the carbon nanotube structure 114 may range from about 0.5 nanometers to about 1 millimeter. The carbon nanotube structure 114 can also be a wire with a diameter ranged from about 0.5 nanometers to about 1 millimeter. In one embodiment, the carbon nanotubes in the carbon nanotube structure 114 are parallel to a surface thereof and aligned approximately along a same direction.

Figure 3:
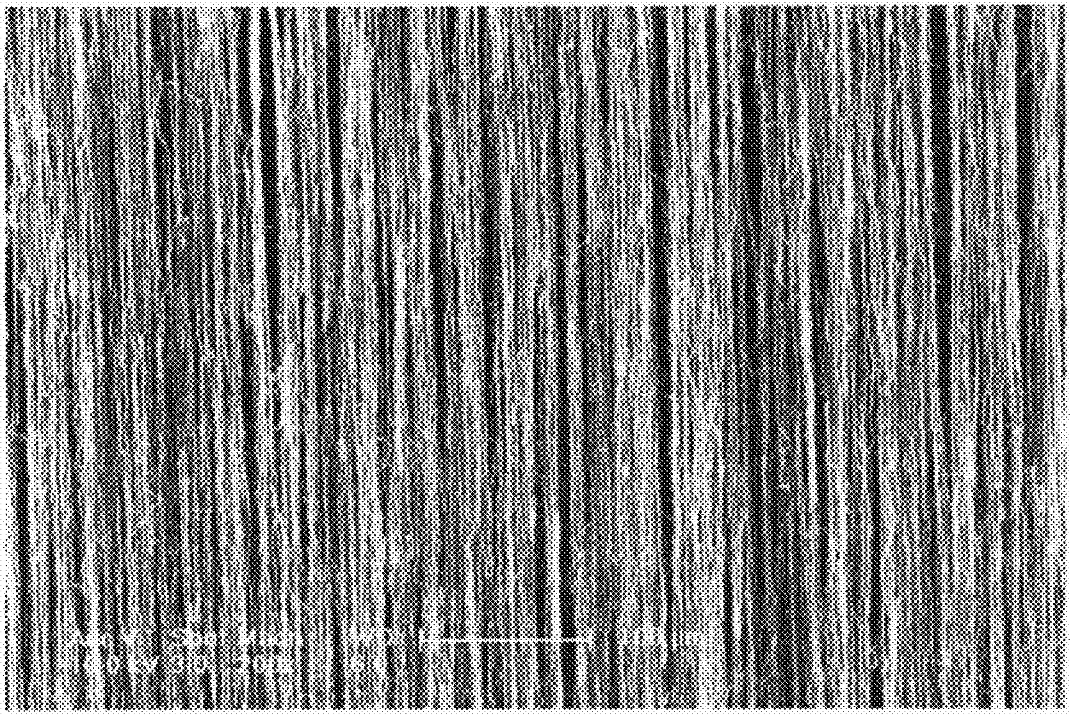
FIG. 3 shows a Scanning Electron Microscope (SEM) image of a drawn carbon nanotube film.
Figure 4:
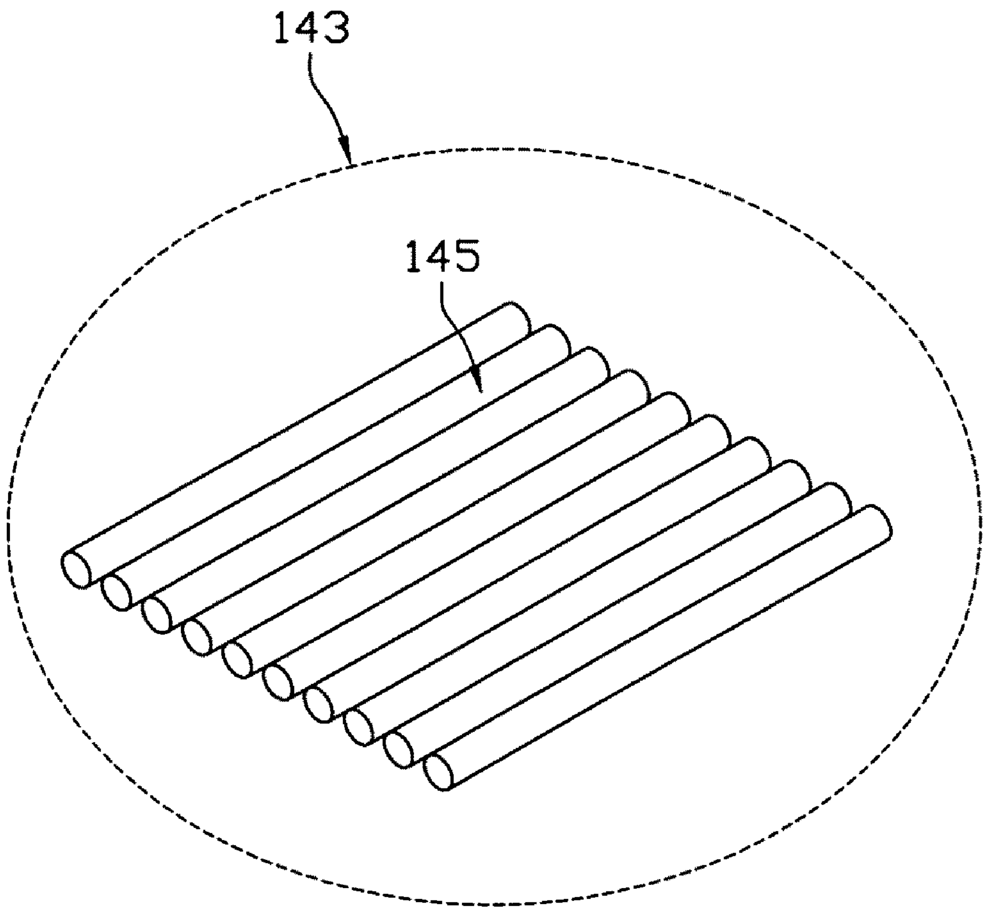
FIG. 4 is a structural schematic view of a carbon nanotube segment.

In one embodiment, the carbon nanotube structure 114 includes at least one drawn carbon nanotube film. Examples of a drawn carbon nanotube film are taught by U.S. Pat. No. 7,045,108 to Jiang et al., and WO 2007015710 to Zhang et al. The drawn carbon nanotube film includes a plurality of successive and oriented carbon nanotubes joined end-to-end by van der Waals attractive force therebetween. The carbon nanotubes in the drawn carbon nanotube film can be substantially aligned in a single direction and parallel to the surface of the drawn carbon nanotube film. The drawn carbon nanotube film is a free-standing film. The drawn carbon nanotube film can be formed by drawing a film from a carbon nanotube array that is capable of having a film drawn therefrom. Referring to FIGS. 3 to 4, each drawn carbon nanotube film includes a plurality of successively oriented carbon nanotube segments 143 joined end-to-end by van der Waals attractive force therebetween. Each carbon nanotube segment 143 includes a plurality of carbon nanotubes 145 parallel to each other, and combined by van der Waals attractive force therebetween. As can be seen in FIG. 3, some variations can occur in the drawn carbon nanotube film. This is true of all carbon nanotube films. The carbon nanotubes 145 in the drawn carbon nanotube film 143 are oriented along a preferred orientation. The drawn carbon nanotube film also can be treated with an organic solvent. After that, the mechanical strength and toughness of the treated carbon nanotube film are increased and the coefficient of friction of the treated carbon nanotube films is reduced. The treated carbon nanotube film has a larger heat capacity per unit area and thus produces less of a thermoacoustic effect than the same film before treatment. A thickness of the drawn carbon nanotube film can range from about 0.5 nanometers to about 100 micrometers. The thickness of the drawn carbon nanotube film can be very thin and thus, the heat capacity per unit area will also be very low. The single drawn carbon nanotube film has a specific surface area of above about 100 $m^2/g$.

A method for making the drawn carbon nanotube film includes the following steps: (a11) providing a carbon nanotube array; and (a12) pulling/drawing out a drawn carbon nanotube film from the carbon nanotube array by using a tool (e.g., adhesive tape, pliers, tweezers, or another tool allowing multiple carbon nanotubes to be gripped and pulled simultaneously).

In step (a110), a given carbon nanotube array can be formed by the following substeps: (a111) providing a substantially flat and smooth substrate; (a112) forming a catalyst layer on the substrate; (a113) annealing the substrate with the catalyst layer in air at a temperature approximately ranging from 700° C. to 900° C. for about 30 to 90 minutes; (a114) heating the substrate with the catalyst layer to a temperature approximately ranging from 500° C. to 740° C. in a furnace with a protective gas therein; and (a115) supplying a carbon source gas to the furnace for about 5 to 30 minutes and growing the carbon nanotube array on the substrate.

In step (a111), the substrate can be a P-type silicon wafer, an N-type silicon wafer, or a silicon wafer with a film of silicon dioxide thereon. In the present embodiment, a 4-inch P-type silicon wafer is used as the substrate. In step (a112), the catalyst can be made of iron (Fe), cobalt (Co), nickel (Ni), or any alloy thereof. In step (a114), the protective gas can be made up of at least one of nitrogen ($N_2$), ammonia ($NH_3$), and a noble gas. In step (a115), the carbon source gas can be a hydrocarbon gas, such as ethylene ($C_2H_4$), methane ($CH_4$), acetylene ($C_2H_2$), ethane ($C_2H_6$), or any combination thereof.

The carbon nanotube array can be approximately 50 microns to 5 millimeters in height and include a plurality of carbon nanotubes parallel to each other and approximately perpendicular to the substrate. The carbon nanotube array formed under the above conditions is essentially free of impurities such as carbonaceous or residual catalyst particles. The carbon nanotubes in the carbon nanotube array are closely packed together by van der Waals attractive force.

In step (a12), the drawn carbon nanotube film includes a plurality of carbon nanotubes, and there are interspaces between adjacent two carbon nanotubes. Carbon nanotubes in the drawn carbon nanotube film can parallel to a surface of the carbon nanotube film. A distance between adjacent two carbon nanotubes can be larger than a diameter of the carbon nanotubes. The drawn carbon nanotube film can be pulled/drawn by the following substeps: (a121) selecting a plurality of carbon nanotube segments having a predetermined width from the carbon nanotube array; and (a122) pulling the carbon nanotube segments at an even/uniform speed to achieve a uniform drawn carbon nanotube film.

In step (a121), the carbon nanotube segments having a predetermined width can be selected by using an adhesive tape such as the tool to contact the carbon nanotube array. Each carbon nanotube segment includes a plurality of carbon nanotubes parallel to each other. In step (a122), the pulling direction is arbitrary (e.g., substantially perpendicular to the growing direction of the carbon nanotube array).

More specifically, during the pulling process, as the initial carbon nanotube segments are drawn out, other carbon nanotube segments are also drawn out end-to-end due to the van der Waals attractive force between ends of adjacent segments. This process of drawing ensures that a continuous, uniform drawn carbon nanotube film having a predetermined width can be formed. Referring to FIG. 4, the drawn carbon nanotube film includes a plurality of carbon nanotubes joined end-to-end. The carbon nanotubes in the drawn carbon nanotube film are all substantially parallel to the pulling/drawing direction of the drawn carbon nanotube film, and the drawn carbon nanotube film produced in such manner can be selectively formed to have a predetermined width. The width of the drawn carbon nanotube film depends on a size of the carbon nanotube array. The length of the drawn carbon nanotube film can be arbitrarily set as desired and can be above 100 meters. When the substrate is a 4-inch P-type silicon wafer, as in the present embodiment, the width of the drawn carbon nanotube film approximately ranges from 0.01 centimeters to 10 centimeters, and the thickness of the drawn carbon nanotube film approximately ranges from 0.5 nanometers to 100 microns.

The drawn carbon nanotube film is transparent and has a transmittance of visible light ranged from about 70% to about 95%. The drawn carbon nanotube film is adhesive in nature. The drawn carbon nanotube film can be attached on the supporting element 116. Various devices can be used as the supporting element 116 to support the drawn carbon nanotube film. The drawn carbon nanotube film is flexible and can be attached on a flexible supporter.

In step (a), at least two drawn carbon nanotube films can be further stacked and/or coplanar disposed. The drawn carbon nanotube film is free-standing and can be handled like a piece paper. Among the stacked and/or coplanar carbon nanotube films, the carbon nanotubes are aligned along a substantially same direction. Adjacent carbon nanotube films can be combined by only the van der Waals attractive force therebetween. The number of the layers of the carbon nanotube films is not limited as long as the carbon nanotube structure 114. However, as the stacked number of the carbon nanotube films increasing, the specific surface area of the carbon nanotube structure will decrease, and a large enough specific surface area (e.g., above 30 $m^2/g$) must be maintained to achieve the thermoacoustic effect. Stacking the carbon nanotube films will add to the structural integrity of the carbon nanotube structure 114. In some embodiments, the carbon nanotube structure 114 is a free standing structure and does not require the use of structural support.

Figure 5:
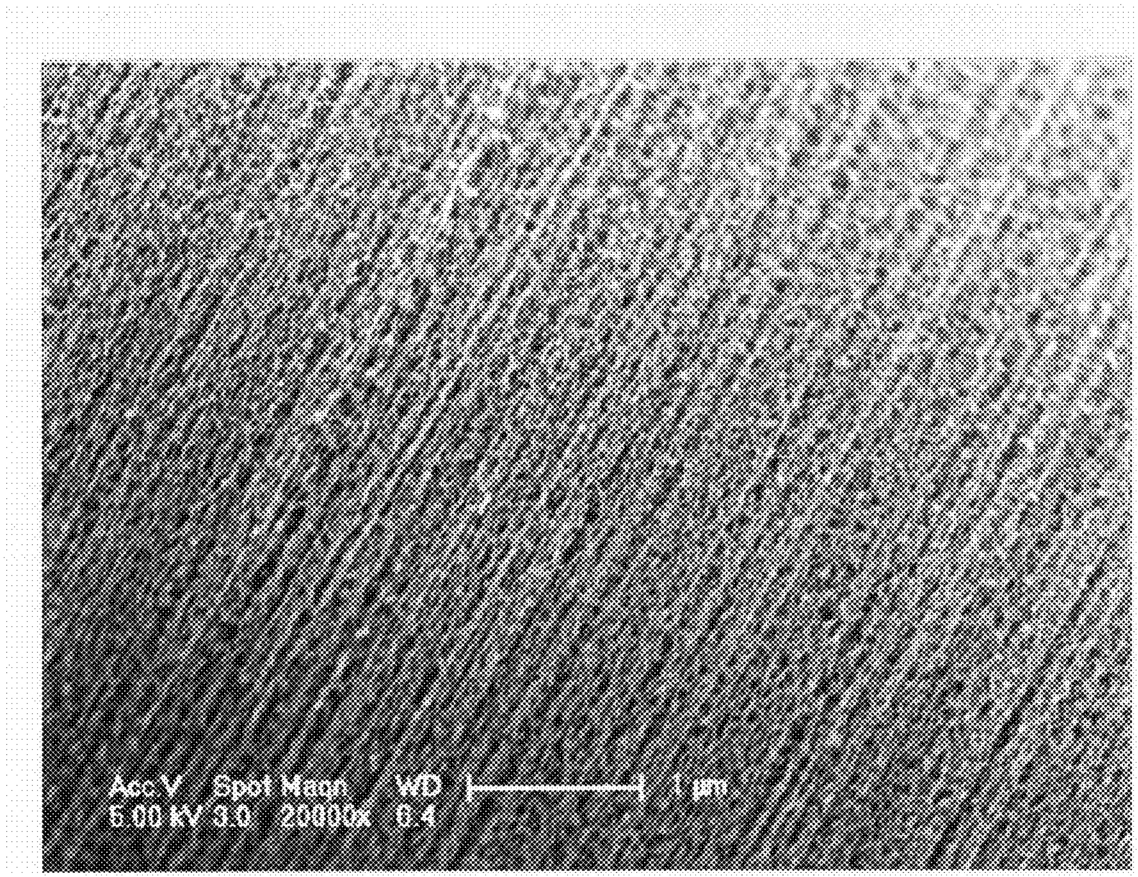
FIG. 5 shows an SEM image of a carbon nanotube segment film.

In other embodiments, the carbon nanotube structure 114 includes a carbon nanotube segment film that comprises at least one carbon nanotube segment. Referring to FIG. 5, the carbon nanotube segment includes a plurality of carbon nanotubes arranged along a preferred orientation. The carbon nanotube segment can be a carbon nanotube segment film that comprises one carbon nanotube segment. The carbon nanotube segment includes a plurality of carbon nanotubes arranged along a same direction. The carbon nanotubes in the carbon nanotube segment are substantially parallel to each other, have an almost equal length and are combined side by side via van der Waals attractive force therebetween. At least one carbon nanotube will span the entire length of the carbon nanotube segment in a carbon nanotube segment film. Thus, one dimension of the carbon nanotube segment is only limited by the length of the carbon nanotubes.

The carbon nanotube structure 114 can further include at least two stacked and/or coplanar carbon nanotube segments. Adjacent carbon nanotube segments can be adhered together by van der Waals attractive force therebetween. An angle between the aligned directions of the carbon nanotubes in adjacent two carbon nanotube segments ranges from 0 degrees to about 90 degrees. A thickness of a single carbon nanotube segment can range from about 0.5 nanometers to about 100 micrometers.

In some embodiments, the carbon nanotube segment film can be produced by growing a strip-shaped carbon nanotube array, and pushing the strip-shaped carbon nanotube array down along a direction perpendicular to a length of the strip. The length of the carbon nanotube segment can range from about 1 millimeter to about 10 millimeters. The length of the carbon nanotube film is only limited by the length of the strip. A larger carbon nanotube film also can be formed by having a plurality of these strips lined up side by side and folding the carbon nanotubes grown thereon over such that there is overlap between the carbon nanotubes on adjacent strips.

A method for making the carbon nanotube segment includes the following steps of: (a21) providing a substrate; (a22) forming a strip-shaped catalyst film on the substrate; (a23) growing a strip-shaped carbon nanotube array on the substrate by using a chemical vapor deposition method; and (a24) causing the strip-shaped carbon nanotube array to be pushed down on the substrate along a direction perpendicular to a length of the strip-shaped catalyst film, thus forming at least one carbon nanotube segment film.

In step (a21), the substrate is a high temperature resistant substrate. A material of the substrate can be any kind of material with a melting point higher than the growing temperature of carbon nanotubes.

In step (a22), the strip-shaped catalyst film is used to grow carbon nanotubes. A material of the strip-shaped catalyst film can be selected from a group consisting of iron, cobalt, nickel and any combination thereof. The strip-shaped catalyst film can be formed by a thermal deposition method, an electron beam deposition method or a sputtering method. The strip-shaped catalyst film also can be formed by a light eroding method or a masking method. A length of the strip-shaped catalyst films is not limited. A width of the strip-shaped catalyst film is less than about 20 micrometers. A thickness of the strip-shaped ranges from about 0.1 nanometers to about 10 nanometers. The length of the strip-shaped catalyst film can be at least 20 times the width. In the present embodiment, the width of the strip-shaped catalyst film ranges from about 1 micrometer to about 20 micrometers.

Step (a23) includes the following steps of: (a231) placing the substrate with the strip-shaped catalyst film thereon into a chamber; (a232) introducing a protective gas to discharge the air in the chamber; (a233) heating the chamber to 600° C.-900° C. with the protective gas therein and sustaining the temperature; and (a234) introducing a gas mixture with a ratio of carbon source gas and carrying gas ranging from 1:30 to 1:3 for 5 to 30 minutes to grow the strip-shaped carbon nanotube array. Step (a23) further includes a step (a235) of ceasing heating the chamber, and removing the substrate with the strip-shaped carbon nanotube array thereon once the substrate has cooled to room temperature.

The protective gas can be made up of at least one of nitrogen ($N_2$), ammonia ($NH_3$), and a noble gas. The carbon source gas can be a hydrocarbon gas, such as ethylene ($C_2H_4$), methane ($CH_4$), acetylene ($C_2H_2$), ethane ($C_2H_6$), or any combination thereof. The carrying gas can be hydrogen gas.

A flow of the carbon source gas ranges from about 20 sccm to about 200 sccm. A flow of the carrying gas ranges from about 50 sccm to about 600 sccm. The protective gas is continuously introduced until the temperature of the chamber being room temperature to prevent oxidation of the carbon nanotubes. In the present embodiment, the protective gas is argon gas, and the carbon source gas is acetylene. A temperature of the chamber for growing strip-shaped carbon nanotube array is 800° C. The gas mixture is introduced for 60 minutes.

The properties of the carbon nanotubes in the carbon nanotube array, such as diameters thereof, and the properties of carbon nanotube film, such as, transparency and resistance thereof can be adjusted by regulating the ratio of the carbon source gas and carrier gas. In the present embodiment, a single-walled carbon nanotube array can be prepared when the ratio of the carbon source gas and the carrier gas approximately ranges from 1:100 to 10:100. A double-walled or multi-walled carbon nanotube array can be acquired when the ratio of the carbon source gas and the carrier gas is increased. The carbon nanotubes in the carbon nanotube array can be selected from a group consisting of single-walled carbon nanotubes, double-walled carbon nanotubes or multi-walled carbon nanotubes.

A height of the carbon nanotube array is increased the longer the introduced time of the gas mixture. In the present embodiment, the height of the carbon nanotube array ranges from about 1 millimeter to about 10 millimeters. The height of the carbon nanotube array can range from about 1 millimeter to about 2 millimeters when the gas mixture is introduced for about 60 minutes.

Step (a24) can be executed by an organic solvent treating method, a mechanical force treating method, or an air current treating method. Step (a24), executed by the organic solvent treating method, includes the following steps of: supplying a container with an organic solvent therein; immersing the substrate with the strip-shaped carbon nanotube array thereon into the organic solvent; and vertically elevating the substrate from the organic solvent along a direction perpendicular to the length of the strip-shaped catalyst film and parallel to the surface of the substrate. The strip-shaped carbon nanotube array is pushed down on the substrate because of the surface tension of the organic solvent to form the carbon nanotube segment. The organic solvent can be selected from a group consisting of ethanol, methanol, acetone, chloroform, and dichloroethane. In the present embodiment, the organic solvent is ethanol.

Step (a24), executed by mechanical force treating method, includes the following steps of: providing a pressing device; and pressing the strip-shaped carbon nanotube array along a direction parallel to a surface of the substrate by the pressing device and perpendicular to the length of the strip-shaped catalyst film, the pressed strip-shaped carbon nanotube array forming the carbon nanotube segment. The pressing device can be, e.g., a pressure head with a glossy surface. In the present embodiment, the pressure head is a roller-shaped pressure head.

Step (a24), executed by the air current treating method, includes the following steps of: providing an air blowing device; and applying an air current by the air blowing device to the carbon nanotube array along a direction parallel to a surface of the substrate and perpendicular to the length of the strip-shaped catalyst film. The strip-shaped carbon nanotube array is blown down on the substrate to form the carbon nanotube segment. The air blowing device can be any device that can produce a strong air current. In the present embodiment, the air device is an electric fan.

Figure 6:
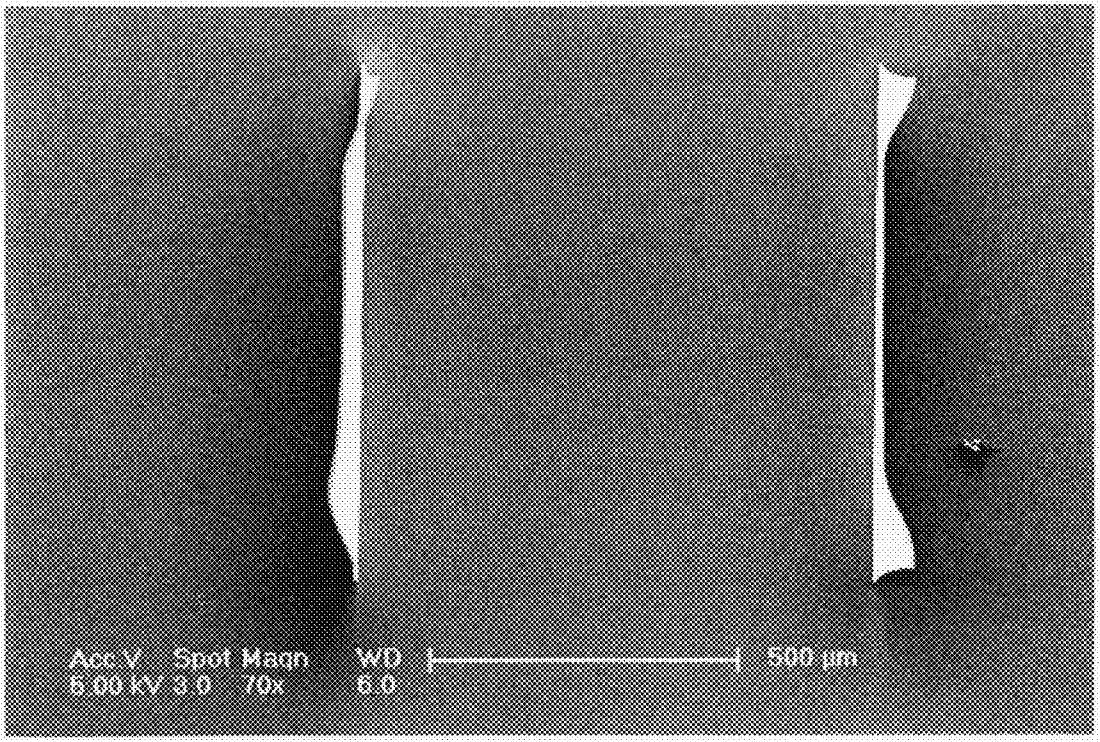
FIG. 6 shows a photo of a top view of two strip-shaped carbon nanotube arrays formed on a substrate.

Referring to FIG. 6, two or more strip-shaped carbon nanotube arrays can be grown from the corresponding strip-shaped catalyst films of substrate. The strip-shaped catalyst films are parallel to each other. A distance between the two adjacent strip-shaped catalyst films ranges from about 10 micrometers to about 10 millimeters and is less than or equal to the height of the carbon nanotubes that are grown from the strip-shaped catalyst films. A distance between the parallel strip-shaped catalyst films is related to a height of the strip-shaped carbon nanotube arrays. The taller the strip-shaped carbon nanotube arrays, the larger the distance between the strip-shaped catalyst films. Whereas the shorter the strip-shaped carbon nanotube arrays, the smaller the distance between the strip-shaped catalyst films. By pushing the strip-shaped carbon nanotube arrays down on the substrate, a plurality of carbon nanotube segments can be overlapped or at least connected with each other on the substrate.

In some embodiments, the carbon nanotube film can be produced by a method adopting a "kite-mechanism" and can have carbon nanotubes with a length of even above 10 centimeters. This is considered by some to be ultra-long carbon nanotubes.

A method for making the carbon nanotube film includes the following steps of: (a31) providing a growing substrate with a catalyst layer located thereon; (a32) placing the growing substrate adjacent to a receiving substrate in a chamber; and (a33) heating the chamber to a growth temperature for carbon nanotubes under a protective gas, introducing a carbon source gas along a gas flow direction, and growing a plurality of carbon nanotubes on the growing substrate. After introducing the carbon source gas into the chamber, the carbon nanotubes starts to grow under the effect of the catalyst. One end (e.g., the root) of the carbon nanotubes is fixed on the growing substrate, and the other end (e.g., the top/free end) of the carbon nanotubes grow continuously. The growing substrate is near an inlet of the introduced carbon source gas, the carbon nanotubes float above the insulating substrate with the roots of the carbon nanotubes still sticking on the growing substrate, as the carbon source gas is continuously introduced into the chamber. The length of the carbon nanotubes depends on the growing conditions. After growth has been stopped, the carbon nanotubes land on the receiving substrate. The carbon nanotubes are then separated from the growing substrate. This can be repeated many times so as to obtain many layers of carbon nanotubes on a single receiving substrate.

In other embodiments, the carbon nanotube structure 114 includes one or more carbon nanotube wire structures. The carbon nanotube wire structure includes at least one carbon nanotube wire. A heat capacity per unit area of the carbon nanotube wire structure can be less than $2\times10^{-4}$ J/cm$^2$·K. In one embodiment, the heat capacity per unit area of the carbon nanotube wire-like structure is less than $5\times10^{-5}$ J/cm$^2$·K. The carbon nanotube wire can be twisted or untwisted. The carbon nanotube wire structure includes carbon nanotube cables that comprise of twisted carbon nanotube wires, untwisted carbon nanotube wires, or combinations thereof. The carbon nanotube cable comprises of two or more carbon nanotube wires, twisted or untwisted, that are twisted or bundled together. The carbon nanotube wires in the carbon nanotube wire structure can be parallel to each other to form a bundle-like structure or twisted with each other to form a twisted structure.

Figure 7:
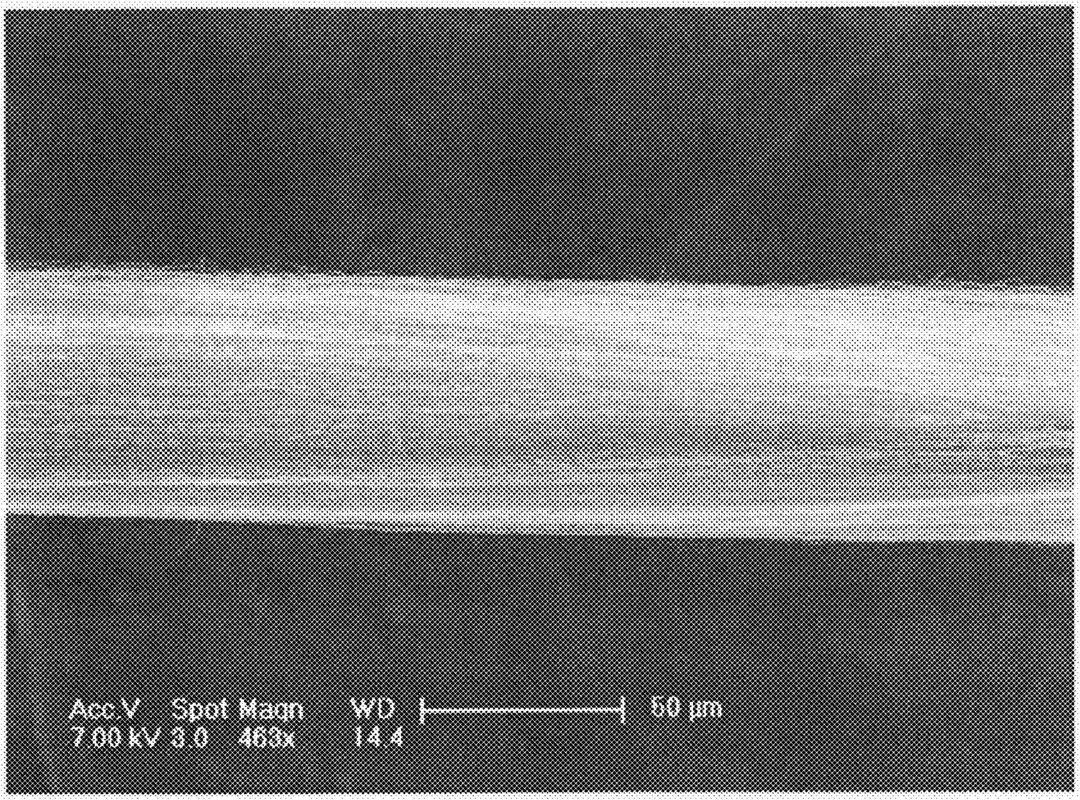
FIG. 7 is an SEM image of a non-twisted carbon nanotube wire.

The untwisted carbon nanotube wire can be formed by treating the drawn carbon nanotube film with a volatile organic solvent. Specifically, the drawn carbon nanotube film is treated by applying the organic solvent to the drawn carbon nanotube film to soak the entire surface of the drawn carbon nanotube film. After being soaked by the organic solvent, the adjacent parallel carbon nanotubes in the drawn carbon nanotube film will bundle together, due to the surface tension of the organic solvent when the organic solvent volatilizes, and thus, the drawn carbon nanotube film will be shrunk into the untwisted carbon nanotube wire. Referring to FIG. 7, the untwisted carbon nanotube wire includes a plurality of carbon nanotubes substantially oriented along a same direction (e.g., a direction along the length of the untwisted carbon nanotube wire). The carbon nanotubes are substantially parallel to the axis of the untwisted carbon nanotube wire. Length of the untwisted carbon nanotube wire can be set as desired. A diameter of the untwisted carbon nanotube wire is in an approximate range from 0.5 nanometers to 100 micrometers. In one embodiment, the diameter of the untwisted carbon nanotube wire is about 50 micrometers. Examples of the untwisted carbon nanotube wire is taught by US Patent Application Publication US 2007/0166223 to Jiang et al.

Figure 8:
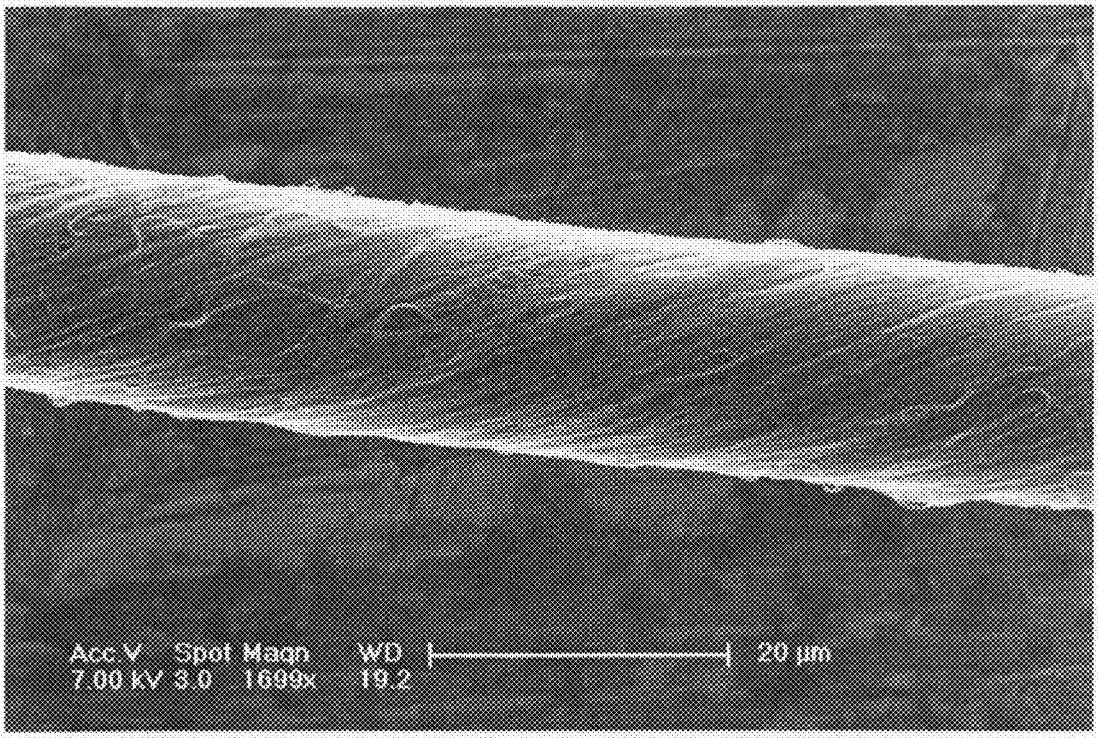
FIG. 8 is an SEM image of a twisted carbon nanotube wire.

The twisted carbon nanotube wire can be formed by twisting a drawn carbon nanotube film by using a mechanical force to turn the two ends of the drawn carbon nanotube film in opposite directions. Referring to FIG. 8, the twisted carbon nanotube wire includes a plurality of carbon nanotubes oriented around an axial direction of the twisted carbon nanotube wire. The carbon nanotubes are aligned around the axis of the carbon nanotube twisted wire like a helix. Length of the carbon nanotube wire can be set as desired. The diameter of the twisted carbon nanotube wire can range from about 0.5 nanometers to about 100 micrometers. Further, the twisted carbon nanotube wire can be treated with a volatile organic solvent, before or after being twisted. After being soaked by the organic solvent, the adjacent paralleled carbon nanotubes in the twisted carbon nanotube wire will bundle together, due to the surface tension of the organic solvent when the organic solvent volatilizing. The specific surface area of the twisted carbon nanotube wire will decrease. The density and strength of the twisted carbon nanotube wire will be increased. It is understood that the twisted and untwisted carbon nanotube cables can be produced by methods that are similar to the methods of making twisted and untwisted carbon nanotube wires.

The carbon nanotube structure 114 can include a plurality of carbon nanotube wire structures parallel to each other. In another embodiment, a single carbon nanotube wire structure can be folded in any desired shape to form the carbon nanotube structure 114. Substantially all the carbon nanotubes in the carbon nanotube structure 114 are aligned along a same direction.

The carbon nanotube structure 114 can be disposed on a supporting element 116. Specifically, the carbon nanotube structure 114 can be adhered on the supporting element 116 by a binder or merely by itself according to its sticky nature. The substrate in step (a21) and the receiving substrate in step (a32) can be used as the supporting element 116.

A shape of the supporting element 116 is not limited, and can be most any two or three dimensional structure, such as a cube, a cone, or a cylinder. The supporting element 116 can be made of rigid material such as wood, glass, rigid plastic, metal, and ceramic; or flexible material such as paper, textile, flexible plastic and resin. In one embodiment, the supporting element 116 can be made of a material having a relatively low thermal conductivity. The supporting element 116 with low thermal conductivity can prevent an over conducting of the thermal energy emitted from the carbon nanotube structure 114 and then prevent the decreasing of the volume of sound. In addition, the supporting element 116 can have a relatively rough surface, thereby the carbon nanotube structure 114 can have an increased contact area with the surrounding medium.

Once the carbon nanotube structure 114 is adhered on supporting element 116, the carbon nanotube structure 114 can be treated with an organic solvent. Specifically, the carbon nanotube structure 114 can be treated by applying organic solvent to the carbon nanotube structure 114 to soak the entire surface of the carbon nanotube structure 114. The organic solvent is volatile at room temperature and can be selected from the group consisting of ethanol, methanol, acetone, dichloroethane, chloroform, any appropriate mixture thereof.

Figure 9:
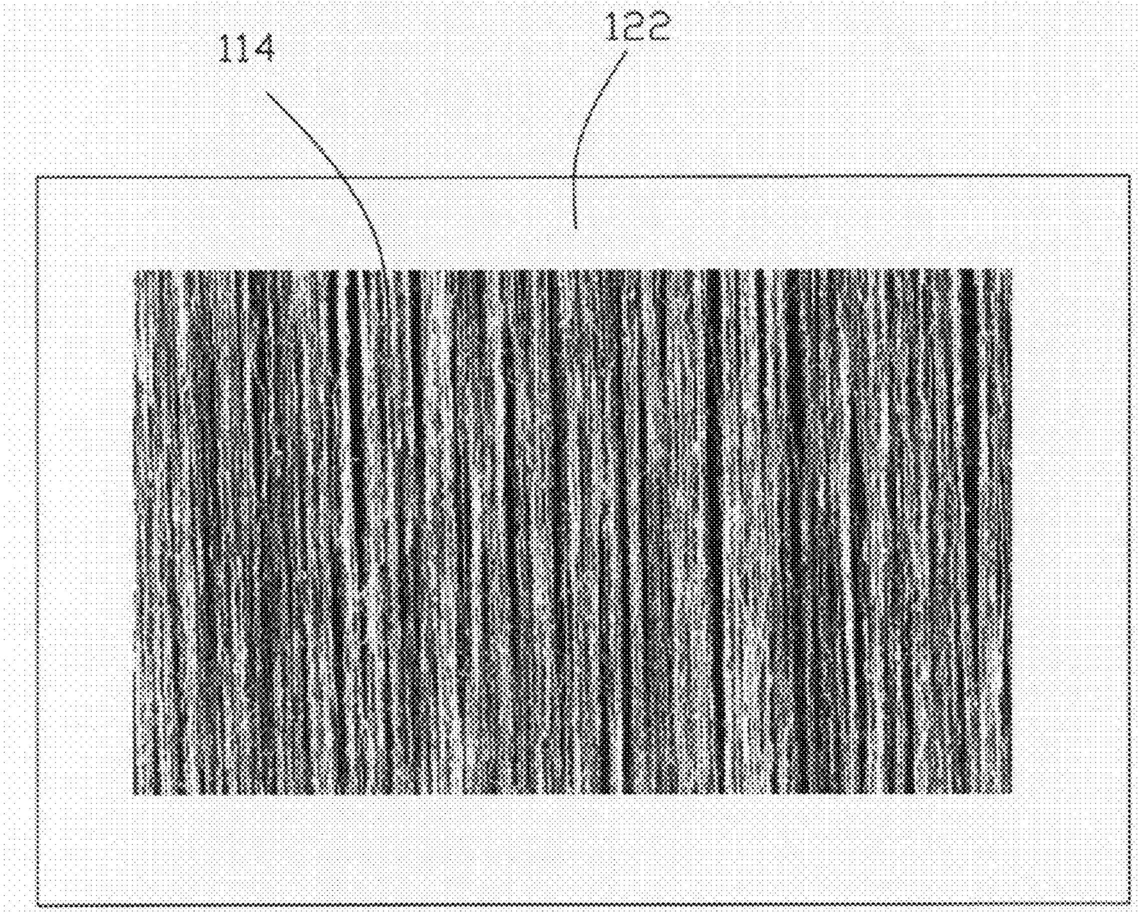
FIG. 9 is a schematic view of a frame-shaped supporting member with a drawn carbon nanotube film thereon.

As shown in FIG. 2, the entire carbon nanotube structure 114 can be disposed on a surface of the supporting element 116. The supporting element 116 protects the carbon nanotube structure 114 and the power of the input electromagnetic signal can be relatively high. The surface of the supporting element 116 can be relatively rough, thus providing a relatively large area of the carbon nanotube structure 114 that contacts with the environmental gas or liquid. In another embodiment, the carbon nanotube structure 114 is free-standing, and a part of the carbon nanotube structure 114 can be attached on a framing element, and other part of the carbon nanotube structure 114 is suspended. The suspended part of the carbon nanotube structure 114 has greater contact area that with the environmental medium. FIG. 9 shows a schematic view of the carbon nanotube structure 114 supported by a framing element 122. A drawn carbon nanotube film used as the carbon nanotube structure 114. Edges of the drawing carbon nanotube film can be attached on the framing element 122 and the central portion of the carbon nanotube structure 114 is suspended. It is also understood that the carbon nanotube structure 114 can use both a supporting element 116 and a framing element 122.

The carbon nanotube structure 114 can be free-standing and the supporting element 116 is optional. In one embodiment, the supporting element 116 is a substrate. The carbon nanotube structure 114 is disposed on a surface of the substrate.

In step (b), the electromagnetic signal source 112 can be spaced from the carbon nanotube structure 114, and provides the electromagnetic signal 118 to be measured. The carbon nanotube structure 114 is in communication with a medium. The incident angle of the electromagnetic signal 118 emitted from the electromagnetic signal source 112 on the carbon nanotube structure 114 is arbitrary. In one embodiment, the electromagnetic signal source 112 faces the surface of the carbon nanotube structure 114 so that the electromagnetic signal 118 is vertically radiated to the carbon nanotube structure 114. The travel direction of the electromagnetic signal 118 is normal to the surface of the carbon nanotube structure 114. The distance between the electromagnetic signal source 112 and the carbon nanotube structure 114 is not limited. In one embodiment, an optical fiber can be further connected to the electromagnetic signal source 112 at one end thereof and transmit the electromagnetic signal 118 to the surface of the carbon nanotube structure 114.

The electromagnetic signal 118 can be varied in intensity and/or frequency. More specifically, the intensity and/or frequency of the electromagnetic signal 118 can be periodically and quickly changed. In the present embodiment, the electromagnetic signal 118 is a pulsed laser (e.g., a femtosecond laser).

In step (d), the carbon nanotube structure 114 received the electromagnetic signal 118 can produce a sound proportional to the intensity of the electromagnetic signal 118. Thus, user can easily measure the intensity of the electromagnetic signal 118, even if the electromagnetic signal 118 is invisible, by the volume of the sound that produced by the carbon nanotube structure 114. The stronger the electromagnetic signal 118, the stronger the sound produced by the carbon nanotube structure. The carbon nanotube structure 114 absorbs the electromagnetic signal 118 and converts the electromagnetic energy into heat energy. The heat capacity per unit area of the carbon nanotube structure 114 is extremely low, and thus, the temperature of the carbon nanotube structure 114 can change rapidly with the input electromagnetic signal 118 at the same frequency. Thermal waves, which are propagated into surrounding medium, are obtained. Therefore, the surrounding medium such as air can be heated at a frequency equal that of the input electromagnetic signal 118. The thermal waves produce pressure waves in the surrounding medium, resulting in sound wave generation. More specifically, the thermal expansion and contraction of the environmental medium results in the production of sound. In this process, it is the thermal expansion and contraction of the medium in the vicinity of the carbon nanotube structure 114 that produces sound. The operation principle of the electromagnetic signal measuring device is an "optical-thermal-sound" conversion. The carbon nanotubes have almost uniform absorption ability over the entire electromagnetic spectrum including radio, microwave through far infrared, near infrared, visible, ultraviolet, X-rays, gamma rays, high energy gamma rays and so on. Thus, the frequency of the electromagnetic signal 118 is not limited. In one embodiment, the electromagnetic signal 118 is a light signal. The frequency of the light signal can be in the range from far infrared to ultraviolet.

The average power intensity of the electromagnetic signal 118 can be in the range from 1 $\mu W/mm^2$~20 $W/mm^2$. It is to be understood that the average power intensity of the electromagnetic signal 118 cannot be too low to heat the environmental medium, and cannot be too high to destroy the carbon nanotube structure 114. In the present embodiment, the electromagnetic signal source 112 is a pulse laser generator (e.g., an infrared laser diode). In other embodiment, a focusing element can be further provided to focus the electromagnetic signal 118 on the carbon nanotube structure 114. Thus, the average power intensity of the original electromagnetic signal 118 can be relatively low.

The intensity of the sound waves generated by the carbon nanotube structure 114, according to one embodiment, can be greater than 50 dB SPL. The frequency response range of one embodiment of the carbon nanotube structure 114 can be from about 1 Hz to about 100 KHz with power input of 4.5 W. In one embodiment, the sound wave level generated by the present carbon nanotube structure 114 reaches up to 70 dB.

The electromagnetic signal 118 can also be polarized, and user can not just measure the intensity of the electromagnetic signal 118 by adopting steps (a), (b) and (d), but also determine the polarizing direction of the electromagnetic signal 118 by adopting an additional step (c). The additional step (c) of rotating the carbon nanotube structure 114 can be further provided to determine the polarizing direction of the electromagnetic signal 118. In step (c), the carbon nanotube structure 114 is rotated in plane. More specifically, the carbon nanotube structure 114 can be disposed on a turntable that is capable of rotating 360 degrees. The rotating degree of the carbon nanotube structure 114 can be at least 90 degrees. To determine the polarizing direction of the electromagnetic signal 118, in the carbon nanotube structure 114, the carbon nanotubes are parallel to a surface of the carbon nanotube structure 114 that receives the electromagnetic signal 118, and the carbon nanotubes are aligned substantially along a same direction, and thus, the electromagnetic signal 118 is selectively absorbed by the carbon nanotube structure 114. The carbon nanotube structure 114 can include the drawn carbon nanotube film, or a plurality of drawn carbon nanotube films aligned along a same direction. The carbon nanotube structure 114 can include the carbon nanotube segment film. The carbon nanotube structure 114 can include one carbon nanotube wire structures, or a plurality of carbon nanotube wire structures and carbon nanotube films that aligned along a same direction.

The oscillations of the electromagnetic signal 118 are in the plane perpendicular to the signal's direction of travel. The electromagnetic signal 118's travel direction can be normal to the surface of the carbon nanotube structure 114. The oscillation (or oscillation vector) of the electromagnetic signal 118 with direction parallel to the orientation of the carbon nanotubes in the carbon nanotube structure 114 is absorbed by the carbon nanotube structure 114. The oscillation (or oscillation vector) of the electromagnetic signal 118 perpendicular to the orientation of the carbon nanotubes in the carbon nanotube structure 114 passes through the carbon nanotube structure 114. Thus, due to the carbon nanotubes in the carbon nanotube structure 114 are substantially aligned along the same direction, when the polarizing direction of the electromagnetic signal 118 is parallel to the orientation of the carbon nanotubes, the electromagnetic signal 118 is most absorbed by the carbon nanotube structure 114, and thus, the sound produced by the carbon nanotube structure 114 reaches the strongest. When the polarizing direction of electromagnetic signal 118 is perpendicular to the orientation of the carbon nanotubes, the electromagnetic signal 118 can pass through the carbon nanotube structure 114, and thus, the sound produced by the carbon nanotube structure 114 reaches the weakest. During rotating of the carbon nanotube structure 114, sound volume changes. In some embodiments, the carbon nanotube structure 114 is rotated circle after circle, the angle between the orientation of the carbon nanotubes and the polarizing direction of the electromagnetic signal 118 is periodically changed, and a sound with periodical changes in volume can be heard directly by human's ears. The aligned direction of the carbon nanotubes in the carbon nanotube structure 114 is known. Thus, user can determine the polarizing direction as parallel to the aligned direction of the carbon nanotubes when the strongest sound being produced, and determine the polarizing direction as perpendicular to the aligned direction of the carbon nanotubes when the weakest sound being produced. The polarizing direction is parallel to the aligned direction of the carbon nanotubes when the strongest sound being produced, and is perpendicular to the aligned direction of the carbon nanotubes when the weakest sound being produced. Accordingly, by rotating the carbon nanotube structure 114 and listening to the sound produced by the carbon nanotube structure 114, the polarizing direction of the electromagnetic signal 118 can be determined.

Figure 10:
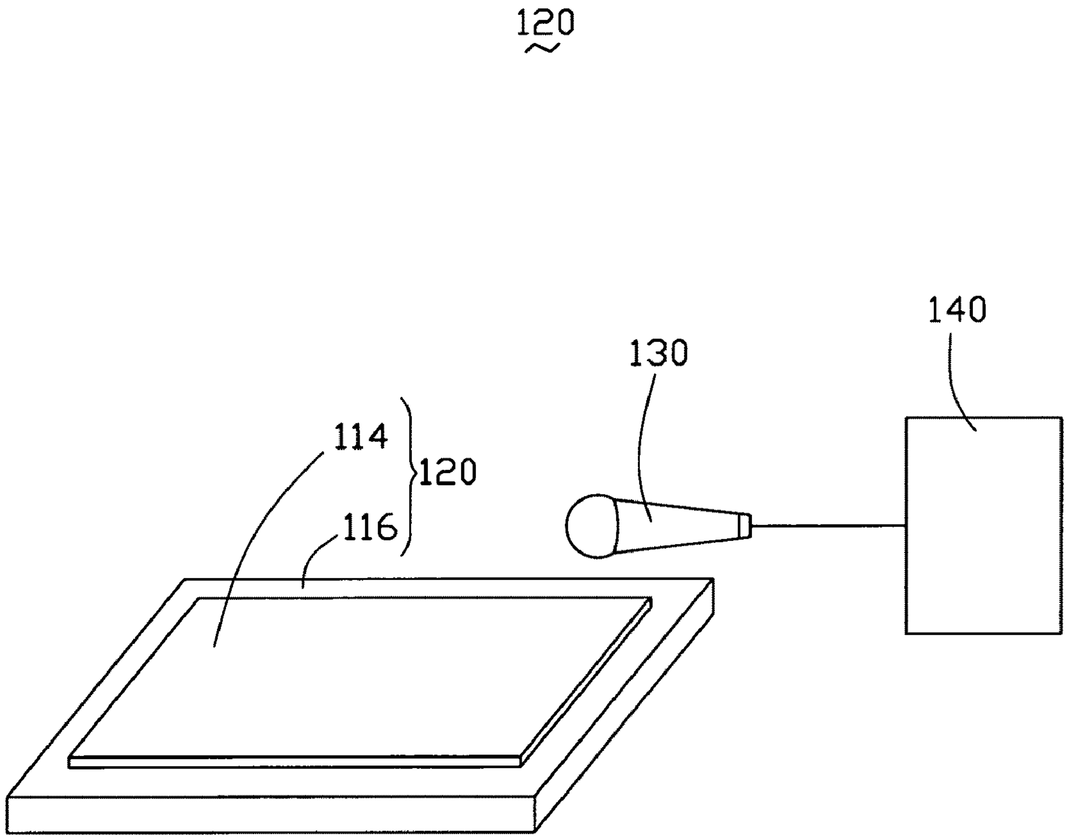
FIG. 10 is a schematic view of a device for measuring the intensity and polarizing direction of the electromagnetic signal in accordance with an embodiment.

Further, referring to FIG. 10, to quantitatively measure the polarizing direction and the intensity of the electromagnetic signal 118, the electromagnetic signal measuring device 120 can further include a signal measuring device. The signal measuring device can quantitatively measure the intensity of the sound waves. In one embodiment, the signal measuring device includes a sound-electro converting device 130 located near the carbon nanotube structure 114, and a voltage measuring device 140 connected to the sound-electro converting device 130.

The sound-electro converting device 130 is capable of outputting an electrical signal having the same frequency according to a sound signal. The electrical signal is transmitted to the voltage measuring device 140. The sound-electro converting device 130 can be a microphone or a pressure sensor, and has a high sensitivity. In the present embodiment, the sound-electro converting device 130 is a microphone. The voltage measuring device 140 is capable of measuring the voltage of the electrical signal from the sound-electro converting device 130. In the present embodiment, the voltage measuring device 140 is an oscilloscope or a voltmeter.

By comparing the voltage of the electrical signal with a voltage of a standard electrical signal, the intensity of the electromagnetic signal 118 can be measured. The standard electric signal is produced by the sound-electro converting device 130 from the sound produced by a standard electromagnetic signal 118 with a known intensity. More specifically, the standard electromagnetic signal 118 with the known intensity is transmitted to the carbon nanotube structure 114, the sound produced by the carbon nanotube structure 114 is converted to the standard electrical signal by the sound-electro converting device 130, and the voltage (standard voltage) of the standard electrical signal is measured by the voltage measuring device 140. This is a form of calibration.

In other embodiment, the signal measuring device can include the sound-electro converting device 130 located near the carbon nanotube structure 114, and a current measuring device connected to the sound-electro converting device 130. The current measuring device is capable of measuring the current of the electrical signal. In the one embodiment, the current measuring device is a galvanometer.

A method for quantitatively measuring intensity and polarizing direction of an electromagnetic signal can further includes steps of: (e) positioning a sound-electro converting device 130 near the carbon nanotube structure 114 and connecting the sound-electro converting device 130 to a voltage measuring device 140; and (f) comparing the voltage of the electrical signal produced by the sound-electro converting device 130 with a voltage of a standard electrical signal, and thereby measuring the intensity of the electromagnetic signal 118.

Figure 11:
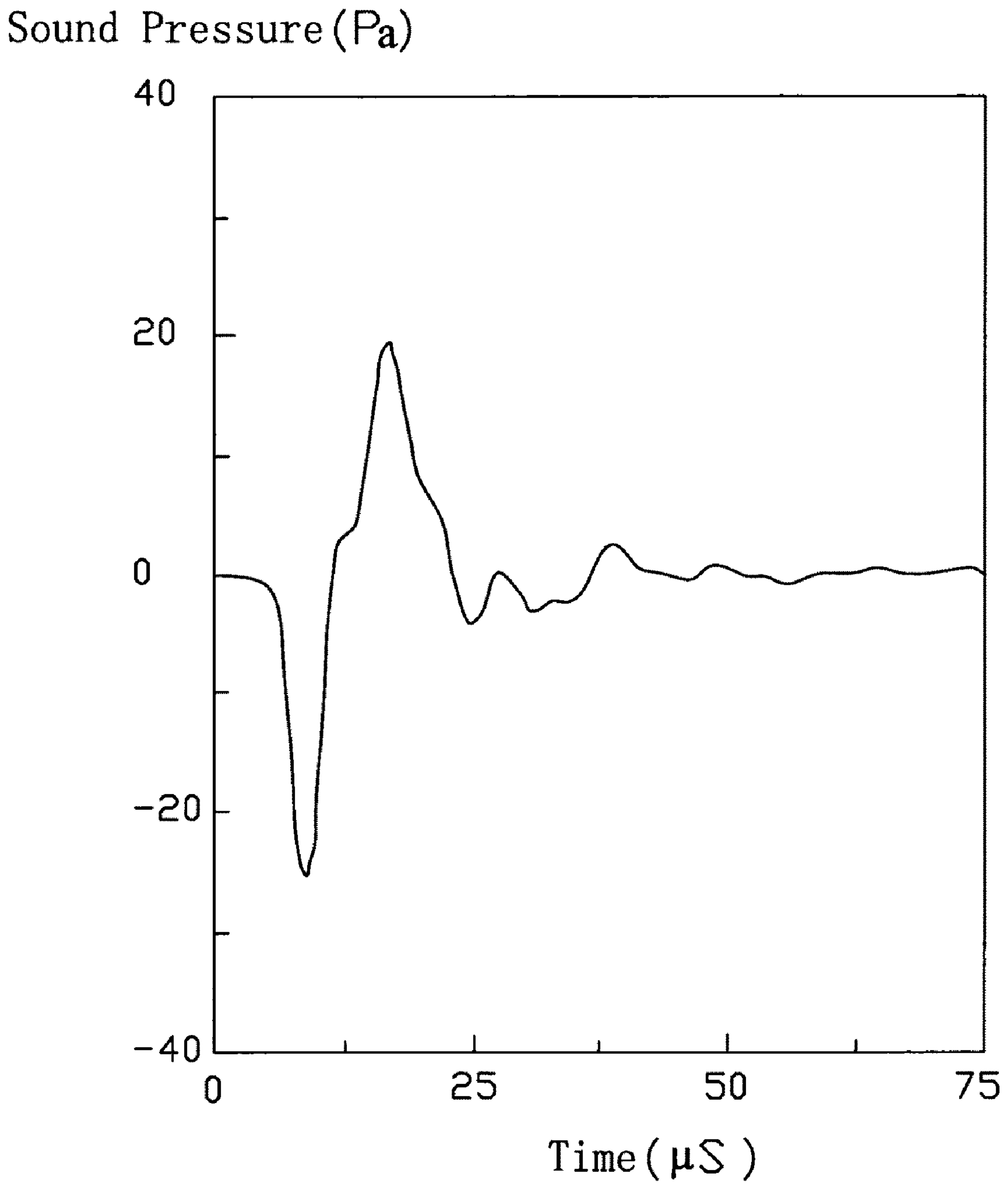
FIG. 11 is a sound pressure curve of a sound produced by an embodiment.
Figure 12:
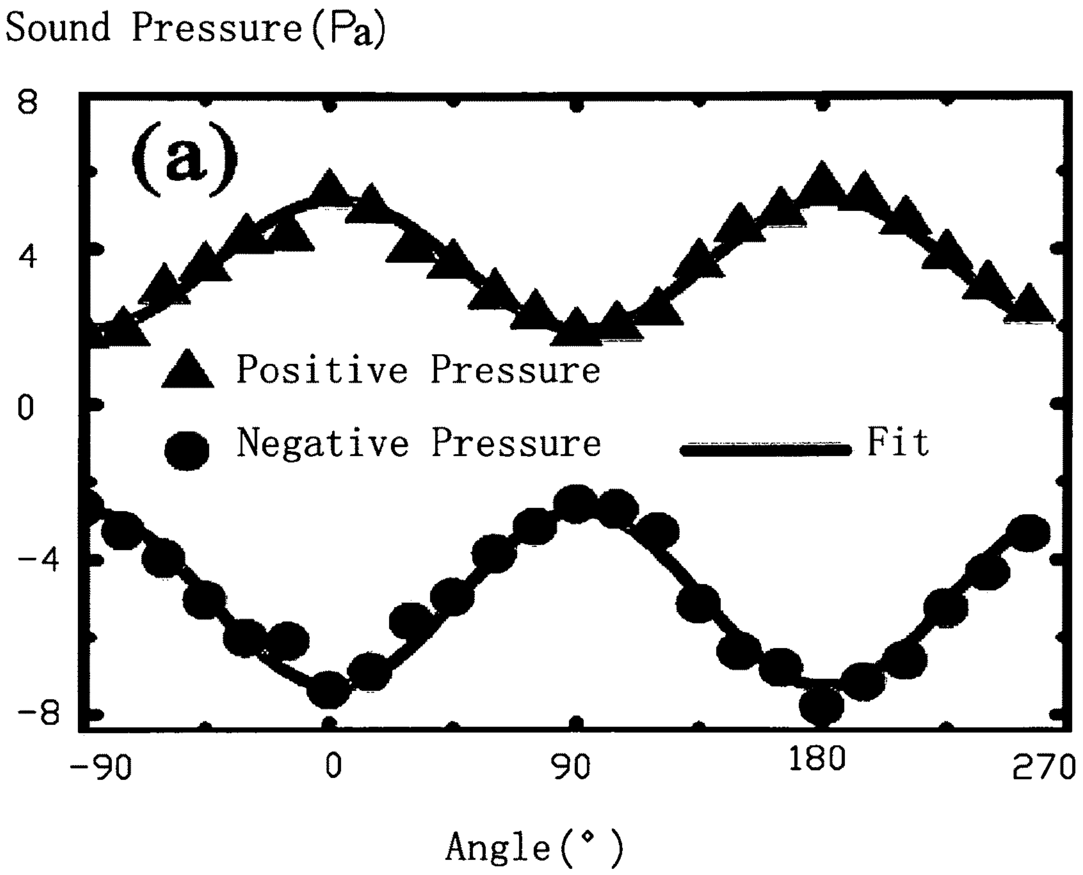
FIG. 12 is a diagram showing a relationship between the polarizing direction of the electromagnetic signal and the sound pressure.
Figure 13:
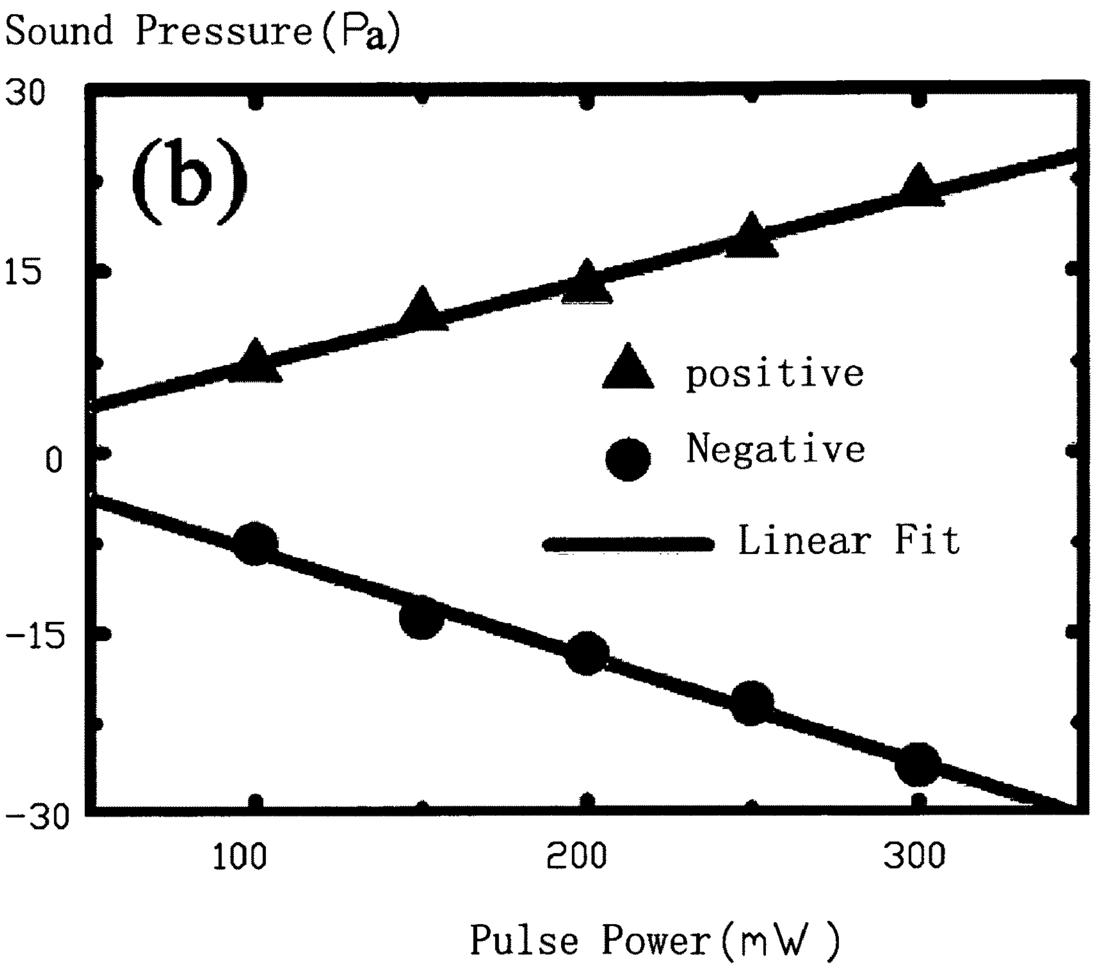
FIG. 13 is a diagram showing a relationship between the intensity of the electromagnetic signal and the sound pressure.

Referring to FIGS. 11 to 13, the relationship among the sound pressure produced by the carbon nanotube structure 114, the aligned direction of the carbon nanotubes in the carbon nanotube structure 114, and the intensity of the electromagnetic signal 118 is quantitatively measured according to one embodiment. The carbon nanotube structure 114 is a drawn carbon nanotube film. The electromagnetic signal 118 is a femtosecond laser. The sound pressure-time curve is shown in FIG. 11. In FIG. 12, the X axis represents an angle between the aligned direction of the carbon nanotubes in the drawn carbon nanotube film and the polarizing direction of the laser. In FIG. 12, when the angle is $0+k\pi(k=0, 1, 2 \ldots)$ (the aligned direction of the carbon nanotubes in the drawn carbon nanotube film is parallel to the polarizing direction of the laser), the sound pressure is highest. When the angle is $\pi/2+k\pi(k=0, 1, 2 \ldots)$ (the aligned direction of the carbon nanotubes in the drawn carbon nanotube film is perpendicular to the polarizing direction of the laser), the sound pressure is lowest. In FIG. 13, the X-axis represents the intensity of the laser. The higher the intensity of the laser, the higher the sound pressure.

The method for measuring the electromagnetic signals is simple. The polarizing direction of the electromagnetic signal 118 can be simply measured by rotating the carbon nanotube structure 114 and listening to the sound changes produced by the carbon nanotube structure 114. In certain instances and for a fairly accurate estimate, the user need not use any additional equipment to determine the polarization of the light or other invisible electromagnetic signals. The intensity of the electromagnetic signal 118 can be simply measured by listening to the sound produced by the carbon nanotube structure 114. The structure of the electromagnetic signal measuring device 120 is simple and has a low cost. The carbon nanotube structure 114 has a uniform absorbability of the electromagnetic signal 118 having different wavelength. Thus, the electromagnetic signal measuring device 120 can be used to measuring various electromagnetic signals 118 having different wavelength.

It is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

It is also to be understood that above description and the claims drawn to a method may include some indication in reference to certain steps. However, the indication used is only to be viewed for identification purposes and not as a suggestion as to an order for the steps.

What is claimed is:

1. A method for measuring properties of an electromagnetic signal comprising steps of:
- providing an electromagnetic signal measuring device comprising a carbon nanotube structure, the carbon nanotube structure comprising a plurality of carbon nanotubes;
- receiving an electromagnetic signal by the carbon nanotube structure in the electromagnetic signal measuring device; and
- measuring an intensity of the electromagnetic signal by sound waves produced by the carbon nanotube structure.

2. The method as claimed in claim 1, wherein the higher the intensity of the electromagnetic signal, the stronger the sound produced by the carbon nanotube structure.

3. The method as claimed in claim 1, wherein further comprising steps of:
- rotating the carbon nanotube structure; and
- determining a polarization of the electromagnetic signal by the sound produced by the carbon nanotube structure;
- wherein providing the electromagnetic signal measuring device comprising the carbon nanotube structure further comprises the carbon nanotubes being parallel to a surface of the carbon nanotube structure and aligned approximately along a same direction.

4. The method as claimed in claim 3, wherein the polarization of the electromagnetic signal is parallel to the aligned direction of the carbon nanotubes when a strongest sound being produced.

5. The method as claimed in claim 3, wherein a weakest sound is produced when the polarization is perpendicular to the aligned direction of the carbon nanotubes.

6. The method as claimed in claim 3, wherein the carbon nanotube structure is rotated at least 90 degrees.

7. The method as claimed in claim 1, wherein further comprising steps of:

positioning a sound-electro converting device that is connected to a signal measuring device near the carbon nanotube structure; and comparing an electrical signal produced by the sound-electro converting device with a baseline electrical signal.

8. The method as claimed in claim 1, wherein the electromagnetic signal is in a spectrum comprising radio, microwave through far infrared, near infrared, visible, ultraviolet, X-rays, gamma rays, high energy gamma rays.

9. The method as claimed in claim 1, wherein the electromagnetic signal is a pulsed laser.

10. The method as claimed in claim 1, wherein the average power intensity of the electromagnetic signal is in the range from about 1 $\mu W/mm^2$ to about 20 $W/mm^2$.

11. The method as claimed in claim 1, wherein the electromagnetic signal is a pulsed laser.

12. A method of measuring intensity and polarization direction of an electromagnetic signal, the method comprising:

providing an electromagnetic signal measuring device comprising a carbon nanotube film;

applying an electromagnetic signal to the carbon nanotube film, wherein the electromagnetic signal causes the carbon nanotube film to produce sound waves by causing a thermal-acoustic effect; and rotating the carbon nanotube film;

wherein intensity and polarization direction of the electromagnetic signal is measured by the intensity of the sound waves of the carbon nanotube film.

13. The method as claimed in claim 12, wherein the carbon nanotube film is pulled from a carbon nanotube array.

14. A method for measuring properties of an electromagnetic signal comprising steps of:

providing an electromagnetic signal measuring device comprising a carbon nanotube film, the carbon nanotube film comprising a plurality of carbon nanotubes parallel to a surface of the carbon nanotube film and aligned approximately along a same direction;

receiving an electromagnetic signal by the carbon nanotube film in the electromagnetic signal measuring device; and rotating the carbon nanotube film; and measuring an intensity and determining a polarization of the electromagnetic signal by sound waves produced by the carbon nanotube film.

15. The method as claimed in claim 14, wherein the higher the intensity of the electromagnetic signal, the stronger the sound produced by the carbon nanotube film.

16. The method as claimed in claim 14, wherein the polarization of the electromagnetic signal is parallel to the aligned direction of the carbon nanotubes when a strongest sound is being produced.

17. The method as claimed in claim 14, wherein a weakest sound is produced when the polarization is perpendicular to the aligned direction of the carbon nanotubes.

18. The method as claimed in claim 14, wherein the carbon nanotube film is rotated at least 90 degrees.

19. The method as claimed in claim 14, wherein further comprising steps of:

positioning a sound-electro converting device that is connected to a signal measuring device near the carbon nanotube film; and comparing an electrical signal produced by the sound-electro converting device with a baseline electrical signal.

20. The method as claimed in claim 14, wherein the electromagnetic signal is in a spectrum comprising radio, microwave through far infrared, near infrared, visible, ultraviolet, X-rays, gamma rays, high energy gamma rays.

* * * * *